United States Patent
Kou et al.

(10) Patent No.: US 8,180,003 B2
(45) Date of Patent: May 15, 2012

(54) APPARATUS AND METHOD FOR GENERATING PER STREAM CHANNEL QUALITY INFORMATION IN MULTIPLE-INPUT MULTIPLE-OUTPUT (MIMO) WIRELESS COMMUNICATION SYSTEM

(75) Inventors: Yajun Kou, Suwon-si (KR); Joo-Hyun Lee, Suwon-si (KR); Sang-Boh Yun, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 864 days.

(21) Appl. No.: 12/287,091

(22) Filed: Oct. 6, 2008

(65) Prior Publication Data

US 2009/0097585 A1    Apr. 16, 2009

(30) Foreign Application Priority Data

Oct. 10, 2007 (KR) .................. 10-2007-0101764
Nov. 30, 2007 (KR) .................. 10-2007-0123347

(51) Int. Cl.
*H04K 1/10* (2006.01)
*H04L 27/28* (2006.01)

(52) U.S. Cl. ......... 375/346; 375/260; 375/221; 375/299; 375/267; 375/347; 455/500; 455/101; 455/63.1; 455/226.1; 455/296

(58) Field of Classification Search .................. 375/346, 375/260, 221, 299, 267, 347, 340; 455/500, 455/101, 63.1, 226.1, 226.3, 296
See application file for complete search history.

(56) References Cited

U.S. PATENT DOCUMENTS 7,860,183 B2 * 12/2010 Maltsev et al. .............. 375/267

* cited by examiner

*Primary Examiner* — Phuong Phu

(57) ABSTRACT

The generation of per stream Channel Quality Information (CQI) in a Multiple-Input Multiple-Output (MIMO) wireless communication system is provided. An apparatus includes a receiver for receiving signals from a transmitting end via a plurality of antennas; an estimator for estimating channels per antenna in relation with the transmitting end using the received signals and constituting a channel matrix; and a generator for deriving per stream effective noise when a lattice reduction scheme is adopted and generating per stream CQI using the per stream effective noise. Thus, feedback information for a Closed Loop (CL) MIMO system can be produced by generating the per stream CQI using the effective noise obtained through the lattice reduction.

24 Claims, 7 Drawing Sheets

US 8,180,003 B2

APPARATUS AND METHOD FOR GENERATING PER STREAM CHANNEL QUALITY INFORMATION IN MULTIPLE-INPUT MULTIPLE-OUTPUT (MIMO) WIRELESS COMMUNICATION SYSTEM

CROSS-REFERENCE TO RELATED APPLICATION(S) AND CLAIM OF PRIORITY

The present application claims priority under 35 U.S.C. §119(a) to a Korean patent application filed in the Korean Intellectual Property Office on Oct. 10, 2007 and assigned Serial No. 2007-101764 and a Korean patent application filed in the Korean Intellectual Property Office on Nov. 30, 2007 and assigned Serial No. 2007-123347, the entire disclosure of which is hereby incorporated by reference.

TECHNICAL FIELD OF THE INVENTION

The present invention relates generally to a Multiple-Input Multiple-Output (MIMO) wireless communication system. More particularly, the present invention relates to an apparatus and a method for generating per stream channel quality information in a MIMO wireless communication system.

BACKGROUND OF THE INVENTION

In accordance with the increasing demands for high-speed and high-quality data transmissions, a Multiple-Input Multiple-Output (MIMO) wireless communication system using a plurality of transmit antennas and receive antennas is attracting much attention as a technique to satisfy those demands. The MIMO technology performs communications using a plurality of streams via the antennas to thus greatly enhance the channel capacity compared to a single-antenna system. For example, when the transmitting end and the receiving end employ M-ary transmit antennas and M-ary receive antennas, respectively, channels of the antennas are independent of each other, and a bandwidth and a total transmit power are fixed, an average channel capacity increases by M times the single antenna.

Recently, the adoption of a Closed Loop (CL) MIMO system is under consideration. In the CL MIMO system, the transmitting end acquires channel conditions of the receiving end and determines per stream Modulation and Coding Scheme (MCS) levels based on the channel conditions of the receiving end. For doing so, the receiving end feeds per stream Channel Quality Information (CQI) back to the transmitting end. The receiving end needs to generate the per stream CQI using its channel information.

When the receiving end uses a Minimum Mean Square Error (MMSE) detection scheme or an MMSE-Ordered Successive Interference Cancellation (OSIC) detection scheme, it is easy to generate the per stream CQI (e.g., Signal to Interference and Noise Ratio (SINR)). In contrast, when the receiving end uses a Maximum Likelihood (ML) detection scheme or a lattice-reduction-aided detection scheme, the generation of the per stream CQI is quite complicated because signals of all streams are detected in one unit. Thus, to apply the ML scheme or the lattice-reduction-aided scheme into the CL MIMO system, a method for generating feedback information suitable to the ML scheme or the lattice-reduction-aided scheme is needed.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for generating per stream Channel Quality Information (CQI) for a Closed Loop (CL) scheme in a Multiple-Input Multiple-Output (MIMO) wireless communication system.

Another aspect of the present invention is to provide an apparatus and a method for generating per stream CQI for a lattice-reduction-aided detection scheme in a MIMO wireless communication system.

Yet another aspect of the present invention is to provide an apparatus and a method for generating per stream CQI for a Maximum Likelihood (ML) detection scheme in a MIMO wireless communication system.

The above aspects are achieved by providing an apparatus for a receiving end in a MIMO wireless communication system. The apparatus includes a receiver for receiving signals from a transmitting end via a plurality of antennas; an estimator for estimating channels per antenna in relation with the transmitting end using the received signals and constituting a channel matrix; and a generator for deriving per stream effective noise when a lattice reduction scheme is adopted and generating per stream CQI using the per stream effective noise.

According to one aspect of the present invention, a method for generating per stream CQI in a MIMO wireless communication system includes receiving signals from a transmitting end via a plurality of antennas; constituting a channel matrix by estimating channels per antenna in relation with the transmitting end using the received signals; deriving per stream effective noise when a lattice reduction scheme is adopted; and generating per stream CQI using the per stream effective noise.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 1 through 7, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

Exemplary embodiments of the present invention provide a technique for generating per stream Channel Quality Information (CQI) for a lattice-reduction-aided detection scheme and a Maximum Likelihood (ML) detection scheme in a Multiple-Input Multiple-Output (MIMO) wireless communication system.

According to the present invention, the per stream CQI is generated largely through three steps. First, a modulation constellation is scaled. Second, Symbol Error Rates (SERs) per stream are calculated. Third, the per stream SERs are converted to a Signal to Interference and Noise Ratios (SINRs), and a final CQI is determined. In the second step, the per stream SERs are calculated with respect to each possible modulation combination. The per stream SERs are calculated in various manners according to a type of a lattice reduction matrix corresponding to the modulation combination. In the following, a method for generating the per stream CQI is described based on equations.

Figure 1A:
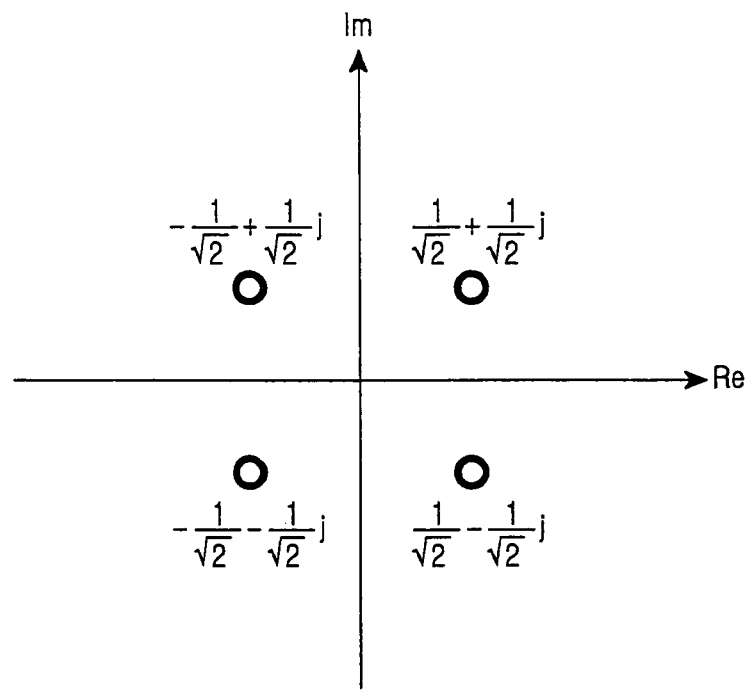
FIG. 1 illustrates constellation scaling and shifting in a MIMO wireless communication system according to an exemplary embodiment of the present invention.
Figure 1B:
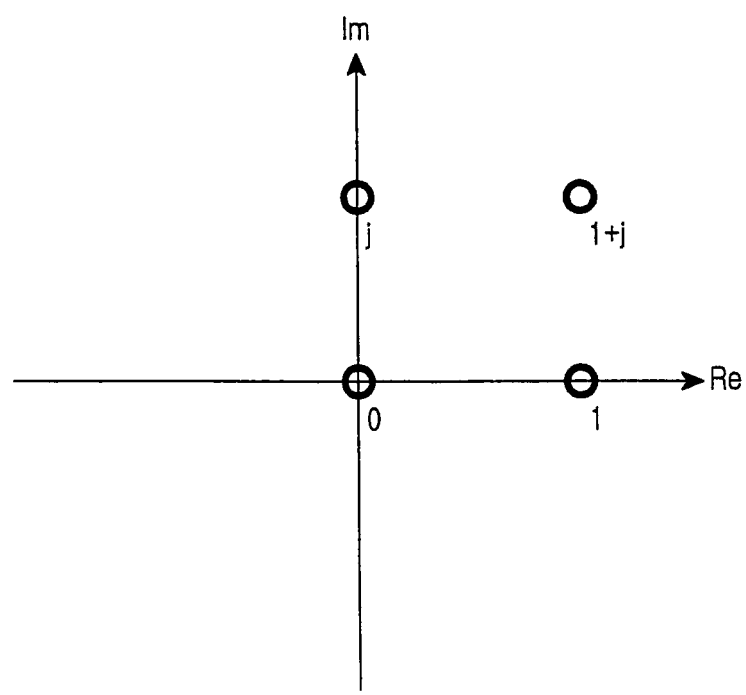

The constellation is scaled to make a distance between neighboring points in the constellation '1'. Accordingly, a channel matrix is scaled as well. For example, when the modulation constellation of a k-th stream is scaled by $1/\alpha$, a k-th column of the channel matrix is scaled by $\alpha$. That is, the k-th column $h_k$ of the channel matrix H is changed to $\alpha h_k$. The scale factor $\alpha$ varies depending on the modulation scheme. The scaled modulation constellation is shifted to make the value of each point an integer. For example, the constellation including four points $$-\frac{1}{\sqrt{2}} + \frac{1}{\sqrt{2}}j, \frac{1}{\sqrt{2}} + \frac{1}{\sqrt{2}}j, \frac{1}{\sqrt{2}} - \frac{1}{\sqrt{2}}j, \text{ and } -\frac{1}{\sqrt{2}} - \frac{1}{\sqrt{2}}j$$

of FIG. 1A is scaled and shifted as shown in FIG. 1B.

When there are M streams and L modulation schemes are available, $M^L$ modulation combinations are produced. Hereinafter, the $M^L$ modulation combinations are constituted as one set, and the i-th modulation combination is defined as M(i). M(i) is [M(i,1), ..., M(i,M)], and M(i,k) denotes a modulation scheme corresponding to the k-th stream in the i-th modulation combination.

Given an arbitrary modulation combination M(i), the scaled channel matrix and the scaled transmit signal are expressed as Equation 1:

$$H_s = [\alpha_{i,1}h_1 \ldots \alpha_{i,M}h_M]x_s = [(1/\alpha_{i,1})x_1 + \beta \ldots (1/\alpha_{i,M})x_M + \beta]^T. \quad [\text{Eqn. 1}]$$

In Equation 1, $H_s$ denotes the scaled channel matrix, $\alpha_{i,m}$ denotes the scaled value of the m-th column of the channel matrix for the i-th modulation combination, $h_m$ denotes the m-th column of the channel matrix, $x_s$ denotes the scaled transmit signal, $x_m$ denotes a receive signal through the m-th stream, and $\beta$ denotes a shifting value. Herein, $\beta$ is a complex number.

The receive signal in Equation 1 can be expressed as Equation 2:

$$r_s = r + H_s \begin{bmatrix} \beta \\ \vdots \\ \beta \end{bmatrix} = \sqrt{\frac{\varepsilon_s}{M}} H_s x_s + n. \quad [\text{Eqn. 2}]$$

In Equation 2, $r_s$ denotes the scaled receive signal, r denotes the receive signal, $\beta$ denotes the shifting value, M denotes the number of streams, $\varepsilon_s$ denotes a total transmit power, $H_s$ denotes the scaled channel matrix, $x_s$ denotes the scaled transmit signal, and n denotes noise.

Using the lattice reduction, Equation 2 can be re-expressed as Equation 3:

$$r_s = \sqrt{\frac{\varepsilon_s}{M}} H_s T z_s + n. \quad [\text{Eqn. 3}]$$

In Equation 3, $r_s$ denotes the scaled receive signal, M denotes the number of streams, $\varepsilon_s$ denotes the total transmit power, $H_s$ denotes the scaled channel matrix, T denotes a lattice reduction matrix, $z_s$ denotes a signal of tentative decision; that is, a signal to be detected through the lattice reduction, and n denotes noise. Herein, $z_s$ is $T^{-1}x_s$, and a real part and an imaginary part of every element in T and $T^{-1}$ are integers.

At this time, an error probability of detecting $z_s$ is required. To detect $z_s$, the present invention deliberates a Zero Forcing (ZF) detection scheme or a Sorted QR Decomposition (SQRD) detection scheme. Hereafter, descriptions are provided according to the detection schemes.

First, the ZF detection scheme is explained.

Through the lattice reduction, a lattice reduction matrix is produced. An effective channel matrix generated varies depending on the modulation combination, and the lattice reduction matrix obtained varies depending on the effective channel matrix. In this exemplary embodiment, the lattice reduction matrix of the unit matrix and the lattice reduction matrix of the non unit matrix are distinguished, and different schemes are applied according to the matrix type.

A case where the lattice reduction matrix is not the unit matrix is explained first.

When the lattice reduction matrix is not the unit matrix, the tentative decision of $z_s$ using the ZF detection scheme is expressed as Equation 4:

$$\hat{z}_s = \text{Round}\left[\left(\frac{\varepsilon_S}{M}T^H H_s^H H_s T\right)^{-1}\right. \quad [\text{Eqn. 4}]$$
$$\left.\sqrt{\frac{\varepsilon_S}{M}}T^H H_s^H\left(\sqrt{\frac{\varepsilon_S}{M}}H_s T z_s + n\right)\right]$$
$$= z_s + \text{Round}[\tilde{n}].$$

In Equation 4, $\hat{z}_s$ denotes a detection value of a signal to be detected using the lattice reduction scheme, Round[ ] denotes a rounding operator, M denotes the number of streams, $\varepsilon_s$ denotes the total transmit power, T denotes the lattice reduction matrix, $H_s$ denotes the scaled channel matrix, $z_s$ denotes a signal to be detected using the lattice reduction, n denotes noise, and $\tilde{n}$ denotes effective noise. Herein, $\tilde{n}$ conforms to the Gaussian distribution, the mean of $\tilde{n}$ is zero, and the variance of $\tilde{n}$ is $\Delta_{\tilde{n}}$.

The only element affecting the detection error in Equation 4 is the effective noise, and the effective noise is expressed as Equation 5:

$$\tilde{n} = \left(\sqrt{\frac{\varepsilon_S}{M}}T^H H_s^H H_s T\right)^{-1}T^H H_s^H n. \quad [\text{Eqn. 5}]$$

In Equation 5, $\tilde{n}$ denotes the effective noise, M denotes the number of streams, $\varepsilon_s$ denotes the total transmit power, T denotes the lattice reduction matrix, $H_s$ denotes the scaled channel matrix, and n denotes noise. Herein, $\tilde{n}$ confirms to the Gaussian distribution, the mean of $\tilde{n}$ is zero, and the variance of $\tilde{n}$ is $\Delta_{\tilde{n}}$.

Based on Equation 4, the transmit signal is determined as Equation 6:

$$\hat{x}_s = T\hat{z}_s = Tz_s + T\text{Round}(\tilde{n}) = x_s + T\text{Round}(\tilde{n}). \quad [\text{Eqn. 6}]$$

In Equation 6, $\hat{x}_s$ denotes the detected transmit signal, T denotes the lattice reduction matrix, $\hat{z}_s$ denotes a detection value of a signal to be detected using the lattice reduction scheme, $z_s$ denotes a signal to be detected using the lattice reduction scheme, Round[ ] denotes a rounding operator, $x_s$ denotes the scaled transmit signal, and $\tilde{n}$ denotes the effective noise.

Figure 2:
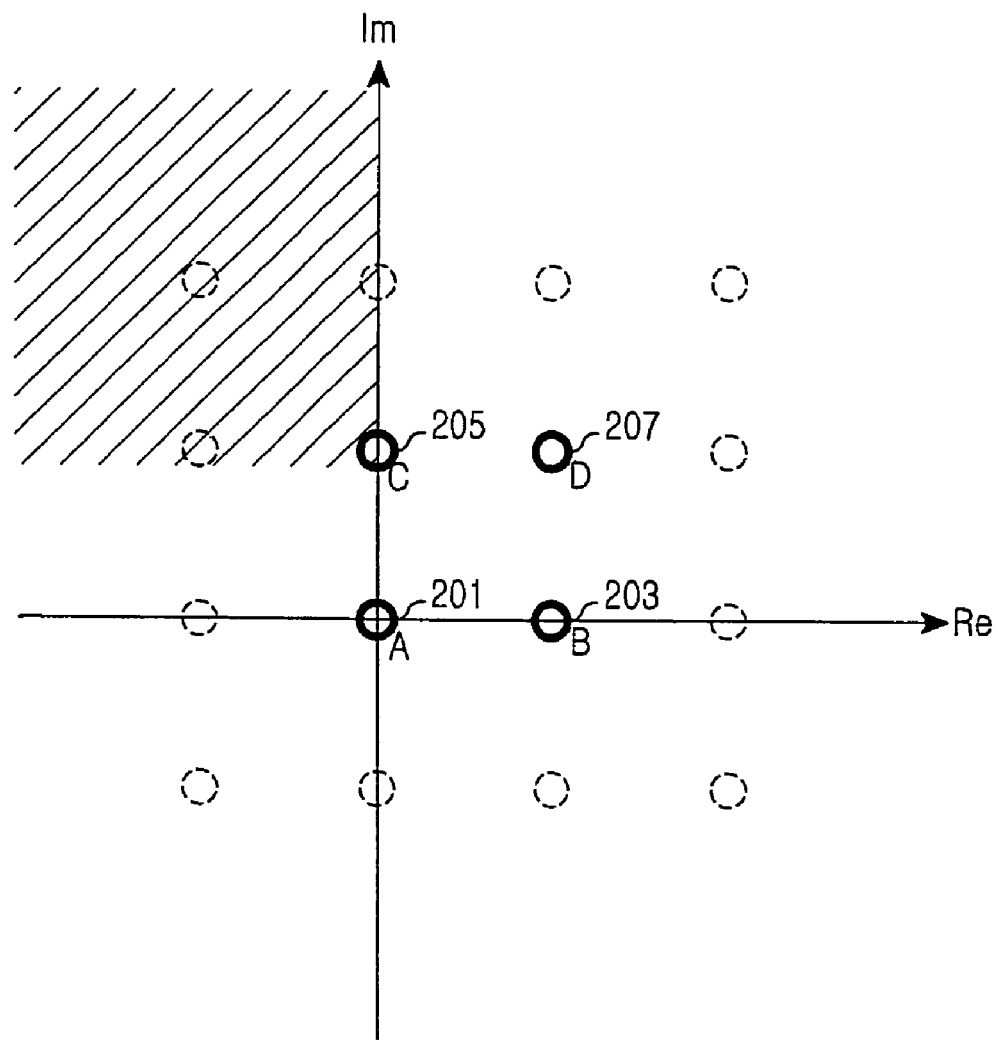
FIG. 2 illustrates a feasible region of an exterior constellation point in the MIMO wireless communication system according to an exemplary embodiment of the present invention.

When calculating the error probability in the transmit signal detection, the transmit signal at the interior constellation point and the transmit signal at the exterior constellation point are differently processed. Herein, the exterior constellation points indicate the outermost points in the constellation points of the modulation scheme, and the interior constellation points indicate the points other than the exterior constellation points. For example, in the modulation scheme, such as Quadrature Phase Shift Keying (QPSK), having four constellation points, the scaled and shifted constellation points are as shown in FIG. 2. Given the constellation points A 201, B 203, C 205, and D 207, the outermost points A 201, B 203, C 205, and D 207 are the exterior constellation points. Since there are no constellation points other than A 201, B 203, C 205, and D 207, the QPSK modulation scheme has no interior constellation points.

When the transmit signal is one of the interior constellation points, the detection error probability of the k-th stream is expressed as Equation 7:

$$P_e[\hat{x}_s(k)] = \text{Prob}[T(k,:)\text{Round}(\tilde{n}) \neq 0]. \quad [\text{Eqn. 7}]$$

In Equation 7, $\hat{x}_s(k)$ denotes the detection value of the transmit signal of the k-th stream, $P_e[\hat{x}_s(k)]$ denotes an error probability of $\hat{x}_s(k)$, T(k,:) denotes the k-th row of the lattice reduction matrix, Round[ ] denotes a rounding operator, $\tilde{n}$ denotes the effective noise, and Prob[A] denotes a probability of an event A.

When the transmit signal is one of the exterior constellation points, the detection error probability of the k-th stream is expressed as Equation 8:

$$P_e[\hat{x}_s(k)] = 1 - \text{Prob}\left[\begin{array}{c} x_s(k) + T(k,:)\text{Round}(\tilde{n}) = \\ \text{any integer point in feasible region} \end{array}\right]. \quad [\text{Eqn. 8}]$$

In Equation 8, $\hat{x}_s(k)$ denotes a detection value of the transmit signal of the k-th stream, $P_e[\hat{x}_s(k)]$ denotes the error probability of $\hat{x}_s(k)$, $x_s(k)$ denotes the transmit signal of the k-th stream, T(k,:) denotes the k-th row of the lattice reduction matrix, $\tilde{n}$ denotes the effective noise, and Prob[A] denotes a probability of an event A.

Based on Equation 8, the probability that $x_s(k)+T(k,:)$ Round($\tilde{n}$) is an integer point in the feasible region is a detection success probability of the k-th stream with respect to the exterior constellation points. Herein, the feasible region covers all the integer points, excluding the exterior constellation points, having the corresponding exterior constellation point as the nearest exterior constellation point. For example, in FIG. 2, the feasible region of the point C 205 is the shaded area.

As expressed in Equation 7 and Equation 8, the error probability is calculated depending on the position of the transmit signal. Accordingly, the detection error probability of the k-th stream is acquired by averaging the detection error probabilities of the feasible transmit signals of the k-th stream, which is expressed as Equation 9:

$$P_e[\hat{x}_s(k)] = \frac{\sum P_e[\hat{x}_s(k) | x_s(k), x_s(k) \in M^{interior}(i,k)]}{\text{Size}[M(i,k)]} + \quad [\text{Eqn. 9}]$$
$$\frac{\sum P_e[\hat{x}_s(k) | x_s(k), x_s(k) \in M^{exterior}(i,k)]}{\text{Size}[M(i,k)]}.$$

In Equation 9, $\hat{x}_s(k)$ denotes the detection value of the transmit signal of the k-th stream, $P_e[\hat{x}_s(k)]$ denotes the error probability of $\hat{x}_s(k)$, $P_e[\hat{x}_s(k)|A]$ denotes a detection error probability of $\hat{x}_s(k)$ under a condition A, $x_s(k)$ denotes the transmit signal of the k-th stream, $M^{interior}(i,k)$ denotes a set of interior constellation points in the constellation of the modulation scheme of the k-th stream of the i-th modulation combination, $M^{exterior}(i,k)$ denotes a set of exterior constellation points in the constellation of the modulation scheme of the k-th stream of the i-th modulation combination, and Size [M(i,k)] denotes the number of points in the constellation of the modulation scheme of the k-th stream of the i-th modulation combination.

It is extremely difficult to directly calculate the detection error probability of the k-th stream. Thus, a lower boundary of the detection success probability of the k-t stream is calculated, and an upper boundary of the detection error probability of the k-th stream is acquired using the lower boundary of the detection success probability of the k-th stream.

The detection error probability of the k-th stream corresponding to the interior constellation points is expressed as Equation 10:

$$P_e[\hat{x}_s(k) \mid x_s(k), x_s(k) \in M^{exterior}(i,k)] = \qquad [\text{Eqn. 10}]$$
$$1 - P_c[\hat{x}_s(k) \mid x_s(k), x_s(k) \in M^{interior}(i,k)] =$$
$$1 - Prob[T(k,:)\,\text{Round}(\tilde{n}) = 0] < 1 - Prob[\text{Round}(\tilde{n}) = 0] =$$
$$1 - \prod_{j=1}^{M} Prob\left[-\frac{1}{2} < \text{real}(\tilde{n}(j)) \leq \frac{1}{2}\right]$$
$$Prob\left[-\frac{1}{2} < \text{imag}(\tilde{n}(j)) \leq \frac{1}{2}\right].$$

In Equation 10, $\hat{x}_s(k)$ denotes the detection value of the transmit signal of the k-th stream, $P_e[\hat{x}_s(k)|A]$ denotes the detection error probability of $\hat{x}_s(k)$ under a condition A, $P_c[\hat{x}_s(k)|A]$ denotes the detection success probability of $\hat{x}_s(k)$ under the condition A, $x_s(k)$ denotes the transmit signal of the k-th stream, $M^{interior}(i,k)$ denotes a set of interior constellation points in the constellation of the modulation scheme of the k-th stream of the i-th modulation combination, $T(k,:)$ denotes the k-th row of the lattice reduction matrix, Round[ ] denotes a rounding operator, $\tilde{n}$ denotes the effective noise, Prob[A] denotes a probability of an event A, and $\tilde{n}(j)$ denotes the effective noise of the j-th stream.

The detection success probability of the k-th stream corresponding to the exterior constellation points is expressed as Equation 11:

$$P_e[\hat{x}_s(k) \mid x_s(k), x_s(k) \in M^{exterior}(i,k)] = \qquad [\text{Eqn. 11}]$$
$$1 - P_c[\hat{x}_s(k) \mid x_s(k), x_s(k) \in M^{exterior}(i,k)] =$$
$$1 - Prob\begin{bmatrix} x_s(k) + T(k,:)\,\text{Round}(\tilde{n}) = \\ \text{any possible integer point in feasible region} \end{bmatrix} <$$
$$1 - Prob[x_s(k) + T(k,:)\,\text{Round}(\tilde{n}) = p_1^{feasible}] -$$
$$Prob[x_s(k) + T(k,:)\,\text{Round}(\tilde{n}) = p_2^{feasible}] - \ldots -$$
$$Prob[x_s(k) + T(k,:)\,\text{Round}(\tilde{n}) = p_L^{feasible}].$$

In Equation 11, $\hat{x}_s(k)$ denotes the detection value of the transmit signal of the k-th stream, $P_e[\hat{x}_s(k)|A]$ denotes the detection error probability of $\hat{x}_s(k)$ under a condition A, $P_c[\hat{x}_s(k)|A]$ denotes the detection success probability of $\hat{x}_s(k)$ under a condition A, $x_s(k)$ denotes the transmit signal of the k-th stream, $M^{exterior}(i,k)$ denotes a set of exterior constellation points in the constellation of the modulation scheme of the k-th stream of the i-th modulation combination, $T(k,:)$ denotes the k-th row of the lattice reduction matrix, Round[ ] denotes a rounding operator, $\tilde{n}$ denotes the effective noise, $p_l^{feasible}$ denotes the l-th possible constellation point, and Prob[A] denotes the probability of an event A.

The effective noise components of the terms in Equation 11 are independent of each other. Considering the proper Signal to Noise Ratio (SNR) region, the variance of the effective noise relatively increases, and the curve of the effective noise probability density function relatively sharpens. In this case, the greater effective noise value, the lower frequency according to the effective noise value. Hence, the rounded value Round[$\tilde{n}(k)$] of the effective noise having the high frequency includes nine cases of 0, ±1, ±j, and ±1±j. As such, the rounded value of the effective noise includes $9^M$-ary various values, and each value complies with the Gaussian distribution. For each of the rounded values of the effective noise, a successful detection value $x_s(k)+T(k,:)\text{Round}(\tilde{n})$ is calculated. When the successful detection value belongs to the feasible transmit signal region, the right detection of the transmit signal is performed. That is, by averaging the detection success probabilities of the transmit signals matching all the exterior constellation points, the detection success probability of the k-th stream corresponding to the exterior constellation points is acquired.

Based on Equations 10 and 11, the upper boundary of the detection error probability of the k-th stream is expressed as Equation 12:

$$SER^{UB}[k, M(i,k)] = \frac{1}{\text{Size}[M(i,k)]} \qquad [\text{Eqn. 12}]$$

$$\left\{\begin{array}{l} \displaystyle\sum_{x_s(k) \in M^{interior}(i,k)} \left\{ 1 - \prod_{j=1}^{M} Prob\left[-\frac{1}{2} < \text{real}(\tilde{n}(j)) \leq \frac{1}{2}\right] \\ Prob\left[-\frac{1}{2} < \text{imag}(\tilde{n}(j)) \leq \frac{1}{2}\right] \right\} + \\ \displaystyle\sum_{x_s(k) \in M^{exterior}(i,k)} \left\{ 1 - Prob\begin{bmatrix} x_s(k) + T(k,:) \\ \text{Round}(\tilde{n}) = p_1^{feasible} \end{bmatrix} - \ldots \\ \ldots - Prob\begin{bmatrix} x_s(k) + T(k,:) \\ \text{Round}(\tilde{n}) = p_L^{feasible} \end{bmatrix} \right\} \end{array}\right\}$$

In Equation 12, $SER^{UB}[k,M(i,k)]$ denotes the upper boundary of a Symbol Error Rate (SER) of the k-th stream of the i-th modulation combination, Size[M(i,k)] denotes the number of points in the constellation of the modulation scheme of the k-th stream of the i-th modulation combination, $x_s(k)$ denotes the transmit signal of the k-th stream, $M^{interior}(i,k)$ denotes a set of interior constellation points in the constellation of the modulation scheme of the k-th stream of the i-th modulation combination, $\tilde{n}(j)$ denotes the effective noise of the j-th stream, $M^{exterior}(i,k)$ denotes a set of exterior constellation points in the constellation of the modulation scheme of the k-th stream of the i-th modulation combination, $T(k,:)$ denotes the k-th row of the lattice reduction matrix, feasible denotes the l-th possible constellation point, $\tilde{n}$ denotes the effective noise, and Prob[A] denotes the probability of an event A.

Now, a case where the lattice reduction matrix is the unit matrix is illustrated.

When the channel condition is good and the lattice reduction matrix is the unit matrix, the tentative decision of $z_s$ using the ZF detection scheme is expressed as Equation 13:

$$\hat{z}_s = \text{Round}\left[\left(\frac{\varepsilon_s}{M}H_s^H H_s\right)^{-1}\sqrt{\frac{\varepsilon_s}{M}}\,H_s^H\left(\sqrt{\frac{\varepsilon_s}{M}}\,H_s z_s + n\right)\right] \qquad [\text{Eqn. 13}]$$
$$= z_s + \text{Round}[\tilde{n}].$$

In Equation 13, $\hat{z}_s$ denotes the detection value of the signal to be detected using the lattice reduction scheme, $\varepsilon_s$ denotes the total transmit power, M denotes the number of streams, $H_s$ denotes a scaled channel matrix, $z_s$ denotes a signal to be detected using the lattice reduction scheme, $\tilde{n}$ denotes effective noise, and Round[ ] denotes a rounding operator.

The only element affecting the detection error in Equation 13 is the effective noise, which is expressed as Equation 14:

$$\tilde{n} = \left(\sqrt{\frac{\varepsilon_S}{M}} H_s^H H_s\right)^{-1} H_s^H n. \quad \text{[Eqn. 14]}$$

In Equation 14, ñ denotes the effective noise, $\varepsilon_s$ denotes the total transmit power, M denotes the number of streams, $H_s$ denotes the scaled channel matrix, and n denotes noise.

Based on Equation 13, the transmit signal is detected as Equation 15:

$$\hat{x}_s = \hat{z}_s = z_s + \text{Round}(\tilde{n}) = x_s + \text{Round}(\tilde{n}). \quad \text{[Eqn. 15]}$$

In Equation 15, $\hat{x}_s$ denotes the detected transmit signal, $\hat{z}_s$ denotes a detection value of the signal to be detected using the lattice reduction scheme, $z_s$ denotes a signal to be detected using the lattice reduction scheme, Round[ ] denotes a rounding operator, ñ denotes the effective noise, and $x_s$ denotes the scaled transmit signal.

Accordingly, the detection value of the transmit signal of the k-th stream corresponding to the interior constellation points is expressed as Equation 16:

$$P_e\begin{bmatrix} \hat{x}_s(k) \mid x_s(k), \\ x_s(k) \in M^{interior}(i,k) \end{bmatrix} = 1 - \text{Prob}\{\text{Round}[\tilde{n}(k)] = 0\} =$$

$$1 - \text{Prob}\left[-\frac{1}{2} < \text{real}(\tilde{n}(j)) \le \frac{1}{2}\right]\text{Prob}\left[-\frac{1}{2} < \text{imag}(\tilde{n}(j)) \le \frac{1}{2}\right]. \quad \text{[Eqn. 16]}$$

In Equation 16, $\hat{x}_s(k)$ denotes the detection value of the transmit signal of the k-th stream, $P_e[\hat{x}_s(k)|A]$ denotes the detection error probability of $\hat{x}_s(k)$ under a condition A, $x_s(k)$ denotes the transmit signal of the k-th stream, $M^{interior}(i,k)$ denotes a set of interior constellation points in the constellation of the modulation scheme of the k-th stream of the i-th modulation combination, ñ(k) denotes the effective noise for the k-th stream, and Prob[A] denotes a probability of an event A.

The detection value of the transmit signal with respect to the k-th stream corresponding to the exterior constellation points is expressed as Equation 17:

$$P_e[\hat{x}_s(k)|x_s(k), x_s(k) \in M^{exterior}(i,k)] = 1 - \text{Prob}\{x_s(k) + \text{Round}[\tilde{n}(k)] = \text{any possible integer point in feasible region}\}. \quad \text{[Eqn. 17]}$$

In Equation 17, $\hat{x}_s(k)$ denotes the detection value of the transmit signal of the k-th stream, $P_e[\hat{x}_s(k)|A]$ denotes the detection error probability of $\hat{x}_s(k)$ under a condition A, $x_s(k)$ denotes the transmit signal of the k-th stream, $M^{exterior}(i,k)$ denotes a set of exterior constellation points in the constellation of the modulation scheme of the k-th stream of the i-th modulation combination, ñ(k) denotes the effective noise of the k-th stream, Round[ ] denotes the rounding operator, and Prob[A] denotes a probability of an event A.

The probability factor in Equation 16 can be defined as Equation 18:

$$Q_k\left(\frac{1}{2}\right) = \text{Prob}\left[\text{real}(\tilde{n}(k)) \le \frac{1}{2}\right] \quad \text{[Eqn. 18]}$$
$$= \text{Prob}\left[\text{imag}(\tilde{n}(k)) \le \frac{1}{2}\right]$$

$$Q_k\left(-\frac{1}{2}\right) = \text{Prob}\left[\text{real}(\tilde{n}(k)) \le \frac{1}{2}\right]$$
$$= \text{Prob}\left[\text{imag}(\tilde{n}(k)) \le \frac{1}{2}\right].$$

In Equation 18, $Q_k(\bullet)$ denotes the Gaussian Q function, ñ(k) denotes the effective noise of the k-th stream, and Prob[A] denotes a probability of an event A.

Based on Equation 18, using the 4-QAM scheme, the detection value of the transmit signal of the k-th stream corresponding to the exterior constellation points is expressed as Equation 19:

$$P_e\begin{bmatrix} \hat{x}_s(k) \mid x_s(k), \\ x_s(k) \in M^{exterior}(i,k) \end{bmatrix} = 1 - \left[\text{Prob}\left(Q_k \le \frac{1}{2}\right)\right]^2. \quad \text{[Eqn. 19]}$$

In Equation 19, $\hat{x}_s(k)$ denotes the detection value of the transmit signal of the k-th stream, $P_e[\hat{x}_s(k)|A]$ denotes the detection error probability of $\hat{x}_s(k)$ under a condition A, $x_s(k)$ denotes the transmit signal of the k-th stream, $M^{exterior}(i,k)$ denotes a set of exterior constellation points in the constellation of the modulation scheme of the k-th stream of the i-th modulation combination, $Q_k(\bullet)$ denotes the Gaussian Q function, and Prob[A] denotes a probability of an event A.

Based on Equation 18, using the 16-QAM scheme, the detection error probability of the transmit signal of the k-th stream corresponding to the exterior constellation points is expressed as Equation 20:

$$P_e\begin{bmatrix} \hat{x}_s(k) \mid x_s(k), \\ x_s(k) \in M^{exterior}(i,k) \end{bmatrix} = \quad \text{[Eqn. 20]}$$

$$1 - \frac{1}{16}\left\{\frac{4Q_k^2\left(\frac{1}{2}\right) + 8\frac{1}{2}Q_k\left(\frac{1}{2}\right)}{\left[Q_k\left(\frac{1}{2}\right) - Q_k\left(-\frac{1}{2}\right)\right] + 4\left[Q_k\left(\frac{1}{2}\right) - Q_k\left(-\frac{1}{2}\right)\right]^2}\right\}.$$

In Equation 20, $\hat{x}_s(k)$ denotes the detection value of the transmit signal of the k-th stream, $P_e[\hat{x}_s(k)|A]$ denotes the detection error probability of $\hat{x}_s(k)$ under a condition A, $x_s(k)$ denotes the transmit signal of the k-th stream, $M^{exterior}(i,k)$ denotes a set of exterior constellation points in the constellation of the modulation scheme of the k-th stream of the i-th modulation combination, and $Q_k(\bullet)$ denotes the Gaussian Q function.

By applying the detection error probability corresponding to the interior constellation point acquired based on Equation 16 and the detection error probability corresponding to the exterior constellation point acquired based on Equation 20 into Equation 9, the upper boundary of the detection error probability when the lattice reduction matrix is the unit matrix is attained.

Now, a case where an SQRD detection scheme is adopted is explained.

The effective channel matrix is QR-decomposed based on Equation 21:

$$\sqrt{\frac{\varepsilon_s}{M}} H_s T = Q_s R_s. \qquad [\text{Eqn. 21}]$$

In Equation 21, M denotes the number of streams, $\varepsilon_s$ denotes the total transmit power, $H_s$ denotes the scaled channel matrix, T denotes the lattice reduction matrix, $Q_s$ denotes a Q channel acquired by QR-decomposing the effective channel matrix, and $R_s$ denotes an R matrix acquired by QR-decomposing the effective channel matrix.

Thus, the received signal is transformed based on Equation 22:

$$\tilde{r}_s = Q_s^H r_s = R_s z_s + Q_s^H n = R_s z_s + \tilde{n}. \qquad [\text{Eqn. 22}]$$

In Equation 22, $\tilde{r}_s$ denotes a matrix acquired by multiplying a Hermitian matrix of the Q matrix obtained through the QR decomposition of the effective channel matrix, by the receive signal, $Q_s^H$ denotes the Hermitian matrix of the Q matrix acquired by QR-decomposing the effective channel matrix, $r_s$ denotes the receive signal, $R_s$ denotes the R matrix acquired by QR-decomposing the effective channel matrix, $z_s$ denotes a signal to be detected using the lattice reduction scheme, n denotes the noise, and ñ denotes the effective noise.

By multiplying the receive signal by the Hermitian matrix of the Q matrix as shown in Equation 22, the signal to detect $\hat{z}_s$ is multiplied by the upper triangular matrix to thus facilitate the signal detection.

In doing so, the noise component is expressed as Equation 23:

$$\tilde{n} = Q_s^H n. \qquad [\text{Eqn. 23}]$$

In Equation 23, ñ denotes the effective noise, $Q_s^H$ denotes the Hermitian matrix of the Q matrix acquired through the QR decomposition of the effective channel matrix, and n denotes the noise.

Using the receive signal transformed as in Equation 22, $\hat{z}_s$ is acquired based on Equation 24:

$$\hat{z}_s(k) = \text{Round}\left[\frac{\tilde{r}_s(k) - \sum_{j=k+1}^{M} R_s(k,j)\hat{z}_s(j)}{R_s(k,k)}\right] \qquad [\text{Eqn. 24}]$$

$$= \text{Round}\left[\frac{\sum_{j=k}^{M} R_s(k,j)z_s(j) - \sum_{j=k+1}^{M} R_s(k,j)\hat{z}_s(j) + \tilde{n}_s(k)}{R_s(k,k)}\right].$$

In Equation 24, $\hat{z}_s(k)$ denotes the detection value of the signal to be detected in the k-th stream using the lattice reduction scheme, $\tilde{r}_s(k)$ denotes a signal corresponding to the k-th stream of the matrix acquired by multiplying the Hermitian matrix of the Q matrix obtained by QR-decomposing the effective channel matrix by the receive signal, $R_s(k,j)$ denotes the element in the j-th row and the k-th column of the R matrix acquired by QR-decomposing the effective channel matrix, $z_s(k)$ denotes the signal to be detected for the k-th stream using the lattice reduction scheme, and $\tilde{n}_s(k)$ denotes the effective noise of the k-th stream.

Provided that the perfect interference cancellation is carried out, Equation 24 can be simplified as Equation 25:

$$\hat{z}_s(k) = \text{Round}\left[\frac{R_s(k,k)z_s(k) + \tilde{n}(k)}{R_s(k,k)}\right] \qquad [\text{Eqn. 25}]$$

$$= z_s(k) + \text{Round}\left[\frac{\tilde{n}(k)}{R_s(k,k)}\right]$$

$$= z_s(k) + \text{Round}[\bar{n}(k)].$$

In Equation 25, $\hat{z}_s(k)$ denotes the detection value of the signal to be detected in the k-th stream using the lattice reduction scheme, $R_s(k,k)$ denotes the element in the k-th row and the k-th column of the R matrix acquired by QR-decomposing the effective channel matrix, $z_s(k)$ denotes the signal to be detected for the k-th stream using the lattice reduction, $\tilde{n}_s(k)$ denotes the effective noise of the k-th stream, and $\bar{n}(k)$ denotes secondary effective noise of the k-th stream.

The noise component affecting the detection error is expressed as Equation 26:

$$\bar{n}(k) \sim N\left(0, \frac{N_0}{\|R_s(k,k)\|_2^2}\right). \qquad [\text{Eqn. 26}]$$

In Equation 26, $\bar{n}(k)$ denotes the secondary effective noise of the k-th stream, N(a,b) denotes the Gaussian distribution having the mean a and the variance b, $N_0$ denotes a noise power, and $R_s(k,k)$ denotes an element in the k-th row and the k-th column of the R matrix acquired by QR-decomposing the effective channel matrix.

The transmit signal is detected based on Equation 27:

$$\hat{x}_s = T\hat{z}_s = Tz_s + T\text{Round}(\bar{n}) = x_s + T\text{Round}(\bar{n}). \qquad [\text{Eqn. 27}]$$

In Equation 27, $\bar{x}_s$ denotes the detection value of the transmit signal, T denotes the lattice reduction matrix, $\hat{z}_s$ denotes the detection value of the signal to be detected using the lattice reduction, $z_s$ denotes the signal to be detected using the lattice reduction scheme, $\bar{n}$ denotes the secondary effective noise, and $x_s$ denotes the transmit signal.

When the lattice reduction matrix is not the unit matrix, the lower boundary of the detection success probability of the k-th stream is calculated based on Equation 28:

$$P_c[\hat{x}_s(k)] \geq Prob[T(k,:)\text{Round}(\bar{n}) = 0] \qquad [\text{Eqn. 28}]$$

$$\geq Prob[\text{Round}(\bar{n}) = 0]$$

$$= \prod_{j=1}^{M} Prob\left[-\frac{1}{2} < \text{real}(\bar{n}(j)) \leq \frac{1}{2}\right]$$

$$Prob\left[-\frac{1}{2} < \text{imag}(\bar{n}(j)) \leq \frac{1}{2}\right].$$

In Equation 28, $\hat{x}_s(k)$ denotes the detection value of the transmit signal of the k-th stream, $P_c[\hat{x}_s(k)]$ denotes the detection success probability of $\hat{x}_s(k)$, T(k,:) denotes the k-th row of the lattice reduction matrix, $\bar{n}(j)$ denotes the effective noise of the interference-rejected j-th stream, and Prob[A] denotes a probability of an event A.

Based on Equation 28, the upper boundary of the detection value of the transmit signal of the k-th stream is expressed as Equation 29:

$$P_e[x_s(k)] = P_e[\hat{x}_s(k)] \leq SER^{UB}[k, M(i,k)] \qquad [\text{Eqn. 29}]$$

-continued $$= 1 - \prod_{j=1}^{M} Prob\left[-\frac{1}{2} < \text{real}(\bar{n}(j)) \le \frac{1}{2}\right]$$

$$Prob\left[-\frac{1}{2} < \text{imag}(\bar{n}(j)) \le \frac{1}{2}\right].$$

In Equation 29, $x_s(k)$ denotes the transmit signal of the k-th stream, $P_e[\hat{x}_s(k)]$ denotes the detection error probability of $x_s(k)$, $\hat{x}_s(k)$ denotes the detection value of the transmit signal of the k-th stream, $P_e[\hat{x}_s(k)]$ denotes the error probability of $\hat{x}_s(k)$, $SER^{UB}[k,M(i,k)]$ denotes an SNR upper boundary of the k-th stream using the k-th modulation scheme of the i-th modulation combination, $\bar{n}(j)$ denotes the effective noise for the interference-rejected j-th stream, and Prob[A] denotes a probability of an event A.

When the lattice reduction matrix is the unit matrix, the lower boundary of the detection success probability of the k-th stream is computed based on Equation 30:

$$P_c[\hat{x}_s(k)] \le \qquad\qquad\qquad\qquad\qquad\qquad \text{[Eqn. 30]}$$

$$\prod_{j=k}^{M} Prob\left[-\frac{1}{2} < \text{real}(\bar{n}(j)) \le \frac{1}{2}\right] Prob\left[-\frac{1}{2} < \text{imag}(\bar{n}(j)) \le \frac{1}{2}\right].$$

In Equation 30, $\hat{x}_s(k)$ denotes the detection value of the transmit signal of the k-th stream, $P_c[\hat{x}_s(k)]$ denotes the detection success probability of $\hat{x}_s(k)$, $\bar{n}(j)$ denotes the effective noise of the interference-rejected j-th stream, and Prob[A] denotes a probability of an event A.

Based on Equation 30, the upper boundary of the detection error probability of the k-th stream is expressed as Equation 31:

$$P_e[x_s(k)] = P_e[\hat{x}_s(k)] \le SER^{UB}[k, M(i, k)] \qquad \text{[Eqn. 31]}$$

$$= 1 - \prod_{j=1}^{M} Prob\left[-\frac{1}{2} < \text{real}(\bar{n}(j)) \le \frac{1}{2}\right]$$

$$Prob\left[-\frac{1}{2} < \text{imag}(\bar{n}(j)) \le \frac{1}{2}\right].$$

In Equation 31, $x_s(k)$ denotes the transmit signal of the k-th stream, $P_e[x_s(k)]$ denotes the detection error probability of $x_s(k)$, $\hat{x}_s(k)$ denotes the detection value of the transmit signal of the k-th stream, $P_e[\hat{x}_s(k)]$ denotes the error probability of $\hat{x}_s(k)$, $SER^{UB}[k,M(i,k)]$ denotes the SNR upper boundary of the k-th stream using the k-th modulation scheme of the i-th modulation combination, $\bar{n}(j)$ denotes the effective noise of the interference-rejected j-th stream, and Prob[A] denotes a probability of an event A.

As above, when the upper boundary of the detection error probability of the k-th stream is obtained according to ZF detection or SQRD detection, the effective Signal to Interference and Noise Ratio (SINR) of the k-th stream is calculated using the upper boundary of the detection error probability of the k-th stream based on Equation 32:

$$SINR_k^{eff}[M(i,k)] = f^{-1}(SER^{UB}[k,M(i,k)], M(i,k)). \qquad \text{[Eqn. 32]}$$

In Equation 32, $SINR_k^{eff}[M(i,k)]$ denotes the effective SINR of the k-th stream of the i-th modulation combination, $f^{-1}(\ )$ is a function which converts the SER to the SINR, $SER^{UB}[k,M(i,k)]$ denotes the upper boundary of the SER of the k-th stream using the k-th of the i-th modulation combination, and M(i,k) denotes the modulation scheme of the k-th stream of the i-th modulation combination.

The inverse function in Equation 32 varies depending on the modulation scheme, for example, as expressed in Equation 33:

$$SINR_k^{eff}(4-QAM) = \left(Q^{-1}\left(1 - \sqrt{1 - SER_e^{UB}(k, 4-QAM)}\right)\right)^2 \qquad \text{[Eqn. 33]}$$

$$SINR_k^{eff}(16-QAM) =$$

$$5\left(Q^{-1}\left(\frac{2}{3}\left(1 - \sqrt{1 - SER_e^{UB}(k, 16-QAM)}\right)\right)\right)^2.$$

In Equation 33, $SINR_k^{eff}$(mod) denotes the effective SINR of the k-th stream when the modulation scheme is mod, $Q^{-1}$ denotes the inverse function of the Gaussian Q function, and $SER^{UB}[k,\text{mod}]$ denotes the upper boundary of the SER of the k-th stream when the modulation scheme is mod.

With respect to each of the possible modulation combinations, the per stream SINRs are calculated, and the per stream SINRs of one modulation combination is determined as the final channel quality information. First of all, the modulation combinations not meeting the required minimum SINR of the modulation scheme are excluded. For example, when the modulation scheme of the m-th stream of the n-th modulation combination is 4-Quadratrue Amplitude Modulation (QAM), the required minimum SINR of the 4-QAM is 14.6 dB, and the calculated SINR is less than 14.6 dB, the n-th modulation combination is excluded from the candidates. Next, among the modulation combinations meeting the required minimum SINR, the per stream SINRs of the modulation combination having the highest sum rate are determined as the final channel quality information.

In the following, structure and operations of the receiving end for generating the channel quality information as mentioned above are described in detail by referring to the drawings.

Figure 3:
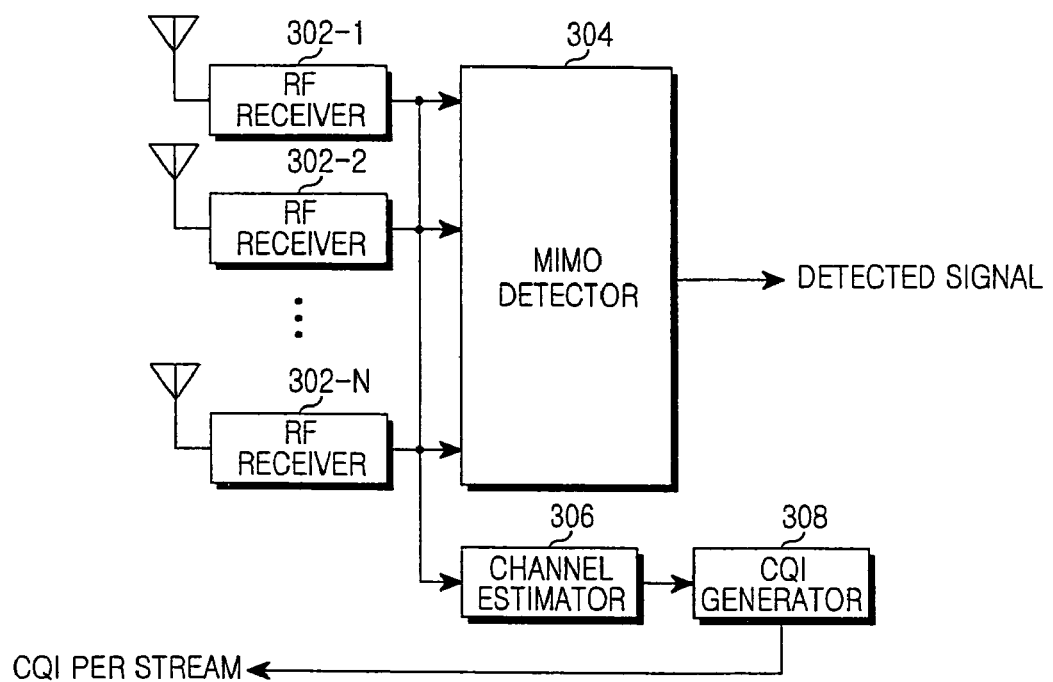
FIG. 3 illustrates a receiving end in the MIMO wireless communication system according to an exemplary embodiment of the present invention.

FIG. 3 is the block diagram of the receiving end in the MIMO wireless communication system according to an exemplary embodiment of the present invention.

The receiving end of FIG. 3 includes a plurality of radio frequency (RF) receivers 302-1 through 302-N, a MIMO detector 304, a channel estimator 306, and a CQI generator 308.

The RF receivers 302-1 through 302-N each convert an RF signal received via respective antennas to a baseband signal. The MIMO detector 304 detects the transmit signals per stream from the received signals output from the RF receivers 302-1 through 302-N. The detection manner of the MIMO detector 304 differs according to various implements. For example, the detection manner includes a Maximum Likelihood (ML) detection scheme, a lattice-reduction-aided detection scheme, a Minimum Mean Square Error (MMSE)-Ordered Successive Interference Cancellation (OSIC) detection scheme, and so forth. The channel estimator 306 estimates channels per antenna to the transmitting end using a pre-designated signal such as pilot signal.

Figure 4:
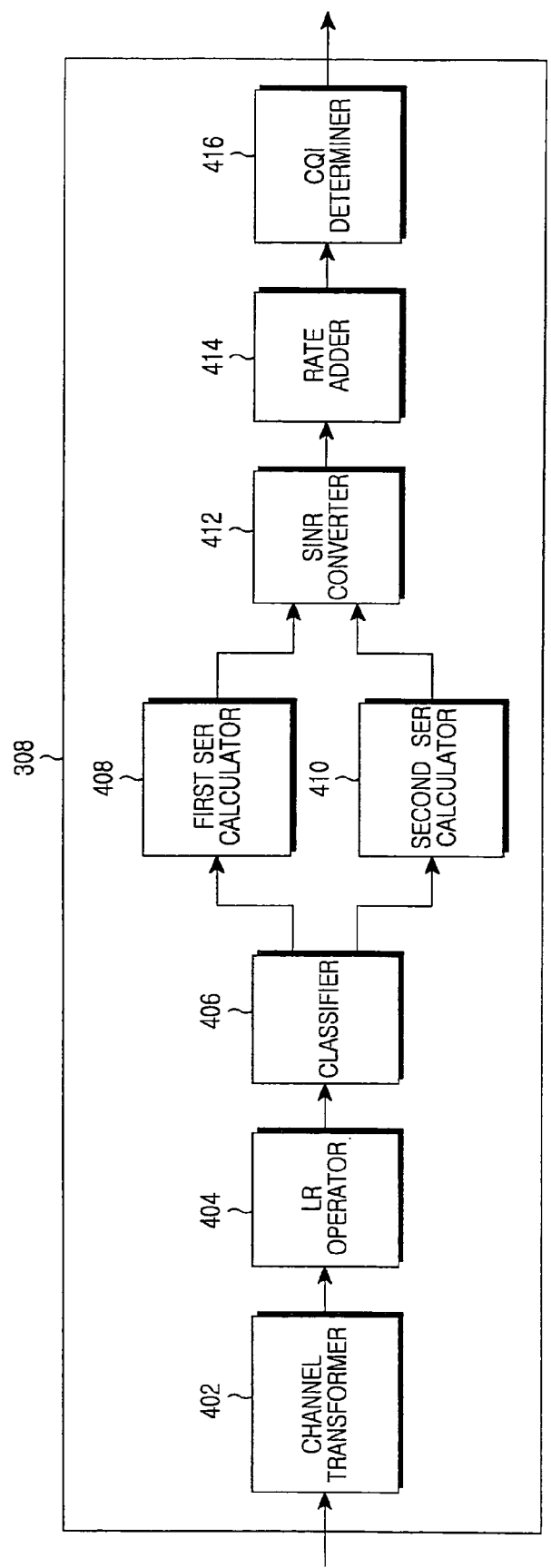
FIG. 4 illustrates a CQI generator in the MIMO wireless communication system according to an exemplary embodiment of the present invention.

The CQI generator 308 generates per stream channel quality information using the channel information output from the channel estimator 306. In more detail, the CQI generator 308 generates the per stream channel quality information by deriving per stream error components using the lattice reduction scheme. Herein, the channel quality information indicates the SINR. Referring now to FIG. 4, the CQI generator 308 includes a channel transformer 402, an LR operator 404, a classifier 406, a first SER calculator 408, a second SER calculator 410, an SINR converter 412, a rate adder 414, and a CQI determiner 416.

The channel transformer 402 generates a list of the possible modulation combinations and scales the channel matrixes output from the channel estimator 306 according to the modulation combinations. More specifically, the channel transformer 402 confirms a scaling value which makes a distance between neighboring points in the constellation of the modulation schemes per stream corresponding to the columns of the channel matrix '1' and scales the channel matrixes according to the scaling value based on Equation 1. As a result, the scaled channel matrixes corresponding to the possible modulation combinations are generated respectively.

The LR operator 404 generates lattice reduction matrixes T corresponding to the scaled channel matrixes using the lattice reduction. The lattice reduction matrix is a matrix where the real part and the imaginary part of every element in the lattice reduction matrix and its inverse matrix are integers. Different lattice reduction matrixes are produced depending on the channel matrixes. The generation of the lattice reduction matrix is well known through various searches in the art. The present invention is applicable to any one of the various methods, which shall be omitted for brevity. For example, the methods for generating the lattice reduction matrix are described in the paper "lattice-reduction-aided detectors for MIMO communication systems" by H. Yao and C. W. Wornell (IEEE Proc. GLOBECOM 2002, vol. 1, pp 424-428, November 2002), and the paper "Complex lattice reduction algorithms for low-complexity MIMO detection" by Y. H. Gan and W. H. Mow (IEEE Proc. GLOBECOM 2005, vol.5, pp. 2953-2957, November 2005).

The classifier 406 checks whether the lattice reduction matrixes corresponding to the modulation combinations are the unit matrix or not. When the lattice reduction matrix is the unit matrix, the classifier 406 outputs information of the corresponding modulation combination to the first SER calculator 408. When the lattice reduction matrix is not the unit matrix, the classifier 406 outputs information of the corresponding modulation combination to the second SER calculator 410.

The first SER calculator 408 calculates the upper boundary of the per stream SER in the first manner for the unit matrix. In doing so, how to calculate the upper boundary of the per stream SER differs depending on the detection scheme adopted for the signal detection.

Using the ZF detection, operations of the first SER calculator 408 are explained based on one stream. With respect to a target stream of the SER to be computed, the first SER calculator 408 calculates per stream detection error probabilities corresponding to the interior constellation points and detection error probabilities corresponding to the exterior constellation points. Next, the first SER calculator 408 sums up the detection error probabilities, divides the sum by the number of the constellation points of the modulation scheme corresponding to the target stream, and thus acquires the upper boundary of the SER of the target stream. At this time, there are no interior constellation points in the target stream, and the first SER calculator 408 does not compute the detection error probabilities corresponding to the interior constellation points of the target stream. Herein, the detection error probability corresponding to the interior constellation point is computed by subtracting the probability that the rounded value of the effective noise of the target stream is zero from '1' (for example, based on Equation 16). The per stream detection error probability corresponding to the exterior constellation point is obtained by subtracting the probability that the sum of the transmit signal and the effective noise is an integer point in the feasible region from '1' (for example, based on Equation 17). The upper boundary of the SER of the target stream is calculated based on Equation 12.

Using SQRD detection, operations of the first SER calculator 408 are now described based on one stream. The first SER calculator 408 calculates the secondary effective noise using the R matrix produced by QR-decomposing the effective channel matrix, subtracts the probability that the secondary effective noise is zero with respect to the target stream of the SER to be computed and every other stream interfered by the target stream from '1', and thus acquires the upper boundary of the SER of the target stream. Herein, the secondary effective noise is produced by dividing the effective noise by a diagonal element of the R matrix. For example, the secondary effective noise for the k-th stream is attained by dividing the effective noise of the k-th stream by the element of the k-th row and the k-th column of the R matrix. The upper boundary of the per stream SER is computed based on Equation 30 and Equation 31.

The second SER calculator 410 calculates the upper boundary of the per stream SER in the second manner for the non unit matrix. How to calculate the upper boundary of the per stream SER varies depending on the detection scheme adopted for the signal detection.

Using the ZF detection, operations of the second SER calculator 410 are illustrated based on one stream. For the target stream of the SER to be computed, the second SER calculator 410 calculates per stream detection error probabilities corresponding to the interior constellation points and detection error probabilities corresponding to the exterior constellation points. Next, the second SER calculator 410 sums up the detection error probabilities, divides the sum by the number of the constellation points of the modulation scheme corresponding to the target stream, and thus acquires the upper boundary of the SER of the target stream. At this time, there are no interior constellation points in the target stream, and the second SER calculator 410 does not calculate the detection error probabilities corresponding to the interior constellation points of the target stream. Herein, the per stream detection error probability corresponding to the interior constellation point is computed by subtracting the probability that the rounded value of the effective noise is zero with respect to every stream from '1' (for example, based on Equation 10). The per stream detection error probability corresponding to the exterior constellation point is obtained by subtracting the probability that the sum of the product of the rounded value of the effective noise and the row corresponding to the target stream in the lattice reduction matrix and the transmit signal is one of integer points in the feasible region from '1' (for example, based on Equation 11). The upper boundary of the SER of the target stream is calculated based on Equation 12.

Using SQRD detection, operations of the second SER calculator 410 are now described based on one stream. The second SER calculator 410 calculates the secondary effective noise using the R matrix produced by QR-decomposing the effective channel matrix, subtracts the probability that the secondary effective noise is zero in every stream from '1', and thus acquires the upper boundary of the SER of the target stream. Herein, the secondary effective noise is produced by dividing the effective noise by the diagonal element of the R matrix. For example, the secondary effective noise of the k-th stream is obtained by dividing the effective noise of the k-th stream by the element of the k-th row and the k-th column of the R matrix. The upper boundary of the SER of the target stream is computed based on Equation 29.

The SINR converter 412 converts the SERs output from the first SER calculator 408 and the second SER calculator 410 to SINRs. The conversion to the SINR varies depending on the modulation scheme. For instance, when the modulation scheme is 4-QAM or 16-QAM, the conversion to the SINR is performed based on one of Equation 11. Since the expression for converting the SER to the SINR is well known in the art, expressions for the other modulation schemes shall be omitted here.

The rate adder 414 calculates a sum rate of stream rates for each modulation combinations. While calculating the sum rate, the rate adder 414 sets the rate of streams having the lower SINR than a threshold to zero. For example, provided that the modulation scheme of the k-th stream of the i-th modulation combination is m, the SINR of the k-th stream generated at the SINR converter 412 is A[dB], a threshold of the SINR required to adopt the modulation scheme m is B[dB], when A[dB] is smaller than B[dB], the rate adder 414 sets the rate of the k-th stream of the i-th modulation combination to zero.

The CQI determiner 416 determines the final channel quality information using the sum rates of the modulation combinations calculated at the rate adder 414. That is, the CQI determiner 416 determines an SINR set of the modulation combination having the highest sum rate as the final channel quality information.

The per stream channel quality information generated as described above is fed back to the transmitting end and used at the transmitting end to determine the scheduling scheme and the transmit signal modulation scheme. Yet, since the modulation scheme is determined together in the generation of the per stream channel quality information, the modulation information may be fed back directly. Although it is not depicted, the receiving end further includes a feedback transmitter for sending the feedback information to the transmitting end. The feedback transmitter sends the per stream channel quality information or the modulation information to the transmitting end.

Figure 5:
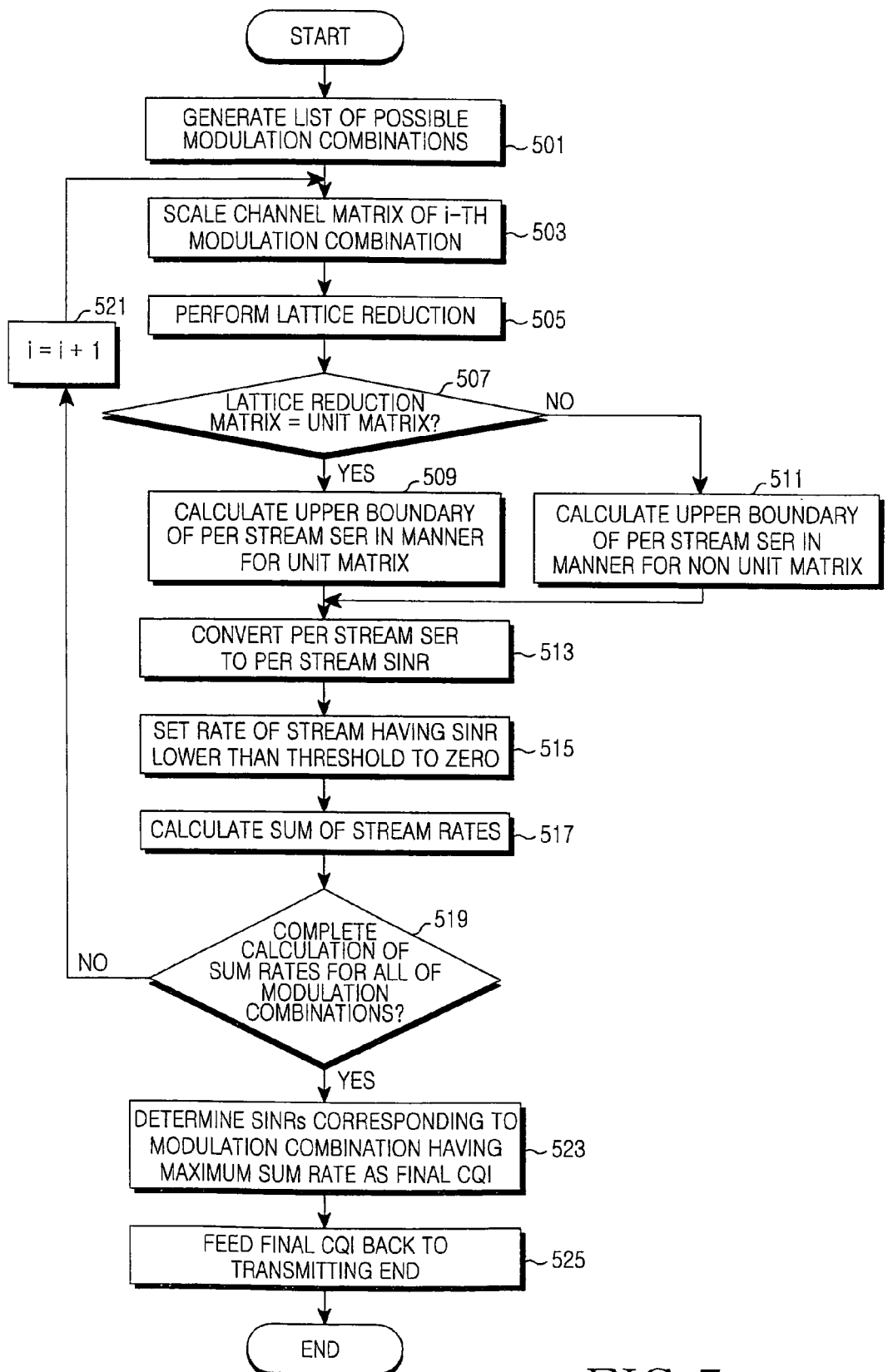
FIG. 5 illustrates a method of the receiving end for generating per stream CQI in the MIMO wireless communication system according to an exemplary embodiment of the present invention.

FIG. 5 illustrates a method of the receiving end for generating the per stream channel quality information in the MIMO wireless communication system according to an exemplary embodiment of the present invention.

In step 501, the receiving end generates the list of the possible modulation combinations. In the subsequent steps, the per stream SINRs corresponding to the possible modulation combinations are generated respectively.

In step 503, the receiving end scales the channel matrix of the i-th modulation combination. At the beginning, the variable i is initialized to '1'.

In step 505, the receiving end generates the lattice reduction matrix T corresponding to the scaled channel matrix using the lattice reduction. The lattice reduction matrix is a matrix where the real part and the imaginary part of every element of the lattice reduction matrix and its inverse matrix are integers. Different lattice reduction matrixes are produced according to the channel matrix. The generation of the lattice reduction matrix is well known through various searches in the art. The present invention is applicable to any other various methods, which shall be omitted for brevity.

In step 507, the receiving end checks whether the generated lattice reduction matrix is the unit matrix or not.

When the lattice reduction matrix is the unit matrix, the receiving end calculates the upper boundary of the per stream SER in the first manner for the unit matrix in step 509. Depending on the detection scheme adopted for the signal detection, the calculation of the upper boundary of the per stream SER varies.

Using the ZF detection scheme, the receiving end calculates per stream detection error probabilities corresponding to the interior constellation points and per stream detection error probabilities corresponding to the exterior constellation points, sums up the per stream detection error probabilities on the stream basis, divides the sum by the number of the constellation points of the modulation scheme corresponding to the stream, and thus acquires the upper boundary of the per stream SER. At this time, when there are no interior constellation points in the target stream of the SER to be calculated, the receiving end does not calculate the detection error probabilities corresponding to the interior constellation points of the target stream. Herein, the per stream detection error probability corresponding to the interior constellation point is computed by subtracting the probability that the rounded value of the effective noise of the target stream of the SER to be calculated is zero from '1' (for example, based on Equation 16). The per stream detection error probability corresponding to the exterior constellation point is obtained by subtracting the probability that the sum of the transmit signal and the effective noise is an integer point in the feasible region from '1' (for example, based on Equation 17 and Equation 18). The upper boundary of the per stream SER is calculated based on Equation 12.

Using an SQRD detection scheme, the receiving end calculates the secondary effective noise using the R matrix produced by QR-decomposing the effective channel matrix, subtracts the probability that the secondary effective noise is zero with respect to the target stream of the SER to be computed and every other stream interfered by the target stream from '1', and thus acquires the upper boundary of the per stream SER. Herein, the secondary effective noise is produced by dividing the effective noise by the diagonal element of the R matrix. For example, the secondary effective noise of the k-th stream is obtained by dividing the effective noise of the k-th stream by the element of the k-th row and the k-th column of the R matrix. For example, the upper boundary of the per stream SER is computed based on Equation 30 and Equation 31.

By contrast, when the lattice reduction matrix is not the unit matrix, the receiving end calculates the upper boundary of the per stream SER in the second manner for the non unit matrix in step 511. Depending on the detection scheme adopted for the signal detection, the upper boundary of the per stream SER calculated differently.

Using ZF detection, the receiving end calculates per stream detection error probabilities corresponding to the interior constellation points and per stream detection error probabilities corresponding to the exterior constellation points, sums up the detection error probabilities based on the stream, divides the sum by the number of the constellation points of the modulation scheme corresponding to the stream, and thus acquires the upper boundary of the per stream SERs. At this time, there are no interior constellation points in the target stream of the SER to be computed, and the receiving end does not calculate the detection error probabilities corresponding to the interior constellation points of the target stream. Herein, the per stream detection error probability corresponding to the interior constellation point is computed by subtracting the probability that the rounded value of the effective noise in every stream is zero from '1' (for example, based on Equation 10 and Equation 11). The per stream detection error probability corresponding to the exterior constellation point is obtained by subtracting the probability that the sum of the product of the rounded value of the effective noise and the row corresponding to the target stream of the SER to be computed in the lattice reduction matrix, and the transmit signal is one of the integer points in the feasible region from '1' (for example, based on Equation 11 and Equation 13). The upper boundary of the per stream SER is calculated based on Equation 12.

Using SQRD detection, the receiving end calculates the secondary effective noise using the R matrix produced by QR-decomposing the effective channel matrix, subtracts the probability that the secondary effective noise of every stream is zero from '1', and thus acquires the upper boundary of the per stream SER. Herein, the secondary effective noise is produced by dividing the effective noise by the diagonal element of the R matrix. For example, the secondary effective noise of the k-th stream is obtained by dividing the effective noise of the k-th stream by the element of the k-th row and the k-th column of the R matrix. For example, the upper boundary of the per stream SER is computed based on and Equation 28 and Equation 29.

After attaining the upper boundary of the per stream SER in step 509 or step 511, the receiving end converts the per stream SERs to the per stream SINRs in step 513. The conversion to the SINR differs depending on the modulation scheme. For example, when the modulation scheme is 4-QAM or 16-QAM, the conversion to the SINR is conducted based on one of Equation 33. Since the expression for converting the SER to the SINR is well known in the art, expressions for the other modulation schemes shall be omitted here.

In step 515, the receiving end sets the sum rate of the stream having the SINR lower than a threshold to zero. For example, provided that the modulation scheme of the k-th stream of the i-th modulation combination is m, the SINR of the k-th stream generated in step 513 is A[dB], the threshold of the SINR required to adopt the modulation scheme m is B[dB], when A[dB] is smaller than B[dB], the receiving end sets the sum rate of the k-th stream of the i-th modulation combination to zero.

In step 517, the receiving end calculates the sum of stream rates of the i-th modulation combination. In further detail, the receiving end calculates the rates of the modulation schemes of the i-th modulation combination and adds up the calculated rates. Note that the rate of the stream set to zero in step 515 is not calculated.

In step 519, the receiving end checks whether the sum rates of all the modulation combinations are calculated in steps 503 through 517.

When not calculating the sum rates of all of the modulation combinations, the receiving end increases i by 1 in step 521 and goes back to step 503.

By contrast, when calculating the sum rates of all of the modulation combinations, the receiving end determines the per stream SINR set of the modulation combination having the maximum sum of the sum rates as the final channel quality information in step 523.

In step 525, the receiving end feeds the final channel quality information back. Since the modulation schemes for each stream are determined together in the generation of the channel quality information, information on the modulation schemes may be fed back.

In the above embodiment in FIGS. 4 and 5, the receiving end calculates the SER in different manners according to the type of the lattice reduction matrix and calculates the SERs by distinguishing between the exterior constellation points and the interior constellation points. According to another exemplary embodiment of the present invention, the receiving end calculates the SERs without distinguishing between the type of the lattice reduction matrix and the type of the constellation points. In this case, the structure of the CQI generator 308 of the receiving end and the operations of the receiving end are illustrated below.

Figure 6:
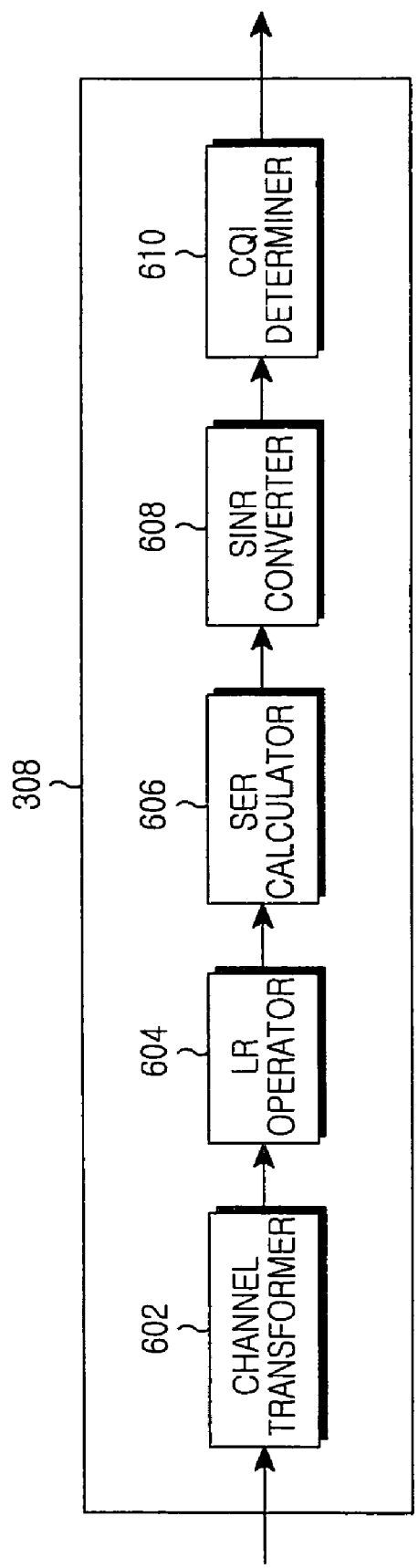
FIG. 6 illustrates a CQI generator in a MIMO wireless communication system according to another exemplary embodiment of the present invention.

FIG. 6 is a block diagram of a CQI generator in a MIMO wireless communication system according to another exemplary embodiment of the present invention.

The CQI generator 308 of FIG. 6 includes a channel transformer 602, an LR operator 604, an SER calculator 606, an SINR converter 608, and a CQI determiner 610.

The channel transformer 602 generates the scaled channel matrixes corresponding to the modulation combinations respectively by scaling the channel matrix output from the channel estimator 306. More specifically, the channel transformer 602 confirms a scaling value which makes a distance between neighboring points in the constellation of the modulation schemes per stream corresponding to the columns of the channel matrix '1' and scales the channel matrix according to the scaling value based on Equation 1. As a result, the scaled channel matrixes corresponding to the possible modulation combinations are generated respectively.

The LR operator 604 generates lattice reduction matrixes T corresponding to the scaled channel matrixes using the lattice reduction. The lattice reduction matrix is a matrix where the real part and the imaginary part of every element in the lattice reduction matrix and its inverse matrix are integers. Different lattice reduction matrixes are produced depending on the channel matrix. The generation of the lattice reduction matrix is well known in the art through various searches. The present invention is applicable to any other various methods, which shall be omitted for brevity. For example, the methods for generating the lattice reduction matrix are described in the paper "lattice-reduction-aided detectors for MIMO communication systems" by H. Yao and C. W. Wornell (IEEE Proc. GLOBECOM 2002, vol. 1, pp 424-428, November 2002), and the paper "Complex lattice reduction algorithms for low-complexity MIMO detection" by Y. H. Gan and W. H. Mow (IEEE Proc. GLOBECOM 2005, vol. 5, pp. 2953-2957, November 2005).

The SER calculator 606 calculates the effective noise using the lattice reduction matrixes acquired at the LR operator 604. Using the effective noise, the SER calculator 606 calculates the upper boundary of the per stream SERs. Herein, the effective noise is computed based on Equation 5, and the upper boundary of the per stream SER is computed based on Equation 34:

$$P_e[x_s(k)] = P_e[\hat{x}_s(k)] \leq SER^{UB}[k, M(i,k)] \quad \text{[Eqn. 34]}$$
$$= 1 - \prod_{k=1}^{M} Prob\left[-\frac{1}{2} < \text{real}(\tilde{n}(k)) \leq \frac{1}{2}\right]$$
$$Prob\left[-\frac{1}{2} < \text{imag}(\tilde{n}(k)) \leq \frac{1}{2}\right].$$

In Equation 34, $x_s(k)$ denotes the signal of the k-th stream among the received signals, $P_e[x_s(k)]$ denotes the detection error probability of $x_s(k)$, $\hat{x}_s(k)$ denotes the detection value of the transmit signal of the k-th stream, $P_e[\hat{x}_s(k)]$ denotes the detection error probability of $\hat{x}_s(k)$, $SER^{UB}[k,M(i,k)]$ denotes the upper boundary of the SER for the k-th stream of the i-th modulation combination, Prob[A] denotes a probability of an event A, and $\tilde{n}(k)$ denotes the effective noise for the k-th stream.

The SINR converter 608 converts the SER calculated at the SER calculator 606 to the SINR. The conversion to the SINR differs depending on the modulation scheme. For instance, when the modulation scheme is 4-QAM or 16-QAM, the conversion to the SINR is performed based on one of Equation 33. Since the expression for converting the SER to the SINR is well known in the art, expressions for the other modulation schemes shall be omitted here.

The CQI determiner 610 selects one modulation combination having the SINRs to be used as the final channel quality information amongst the plurality of the modulation combinations. More specifically, the CQI determiner 610 excludes the SINR set not satisfying the required minimum SINR of the modulation scheme from the candidates. Next, the CQI determiner 610 determines the SINR set of the modulation combination having the highest sum rate as the final channel quality information.

The per stream channel quality information generated as above is fed back to the transmitting end and used by the transmitting end to determine the scheduling scheme and the transmit signal modulation scheme. Yet, since the modulation scheme is determined together in the generation of the per stream channel quality information, the modulation information may be fed back directly. Although it is not depicted, the receiving end further includes a feedback transmitter for sending the feedback information to the transmitting end. The feedback transmitter sends the per stream channel quality information or the modulation information to the transmitting end.

Figure 7:
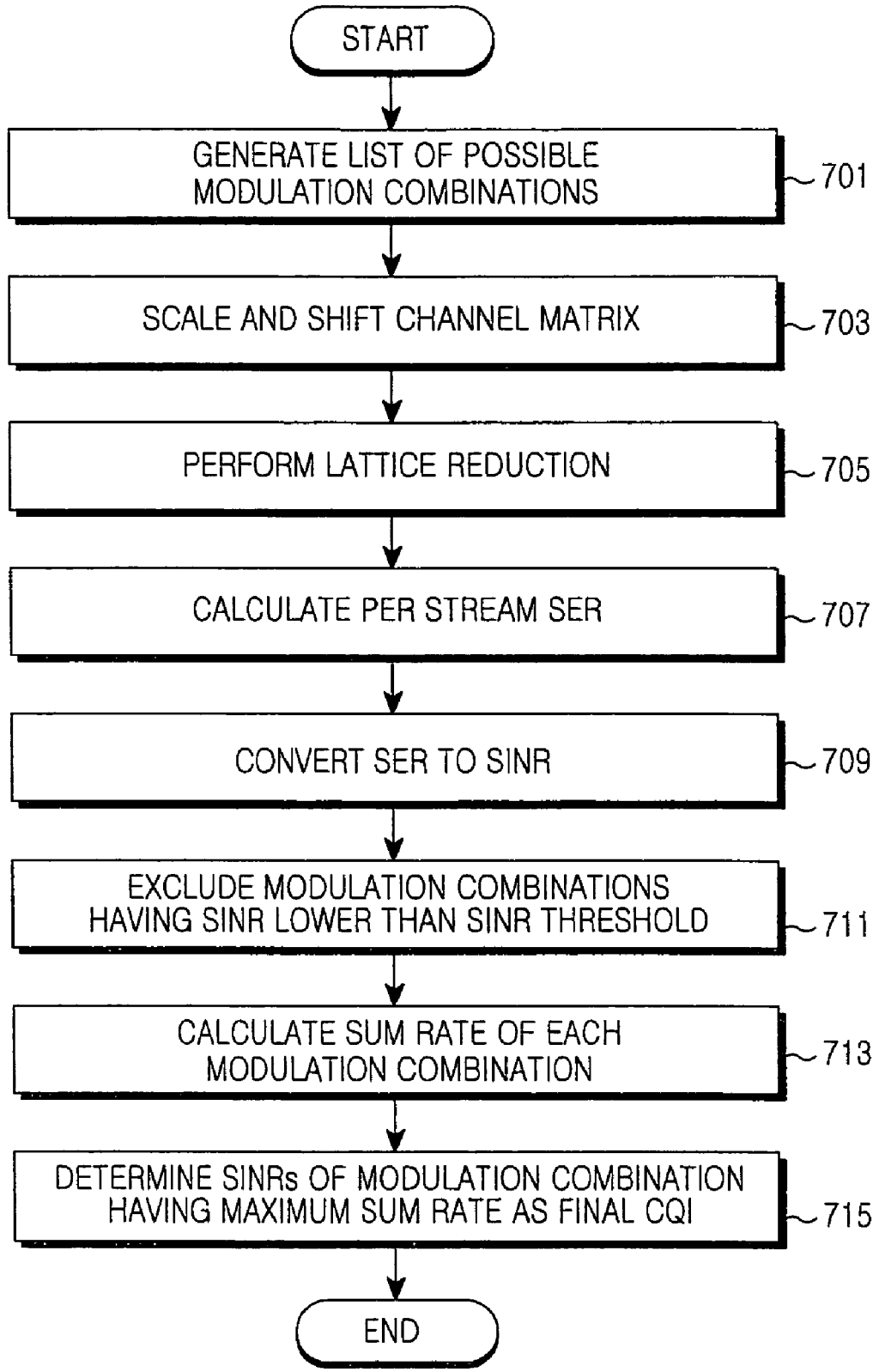
FIG. 7 illustrates a method of the receiving end for generating per stream CQI in the MIMO wireless communication system according to another exemplary embodiment of the present invention.

FIG. 7 illustrates a method of the receiving end for generating the per stream CQI in the MIMO wireless communication system according to another exemplary embodiment of the present invention.

In step 701, the receiving end generates the list of the possible modulation combinations. In the subsequent steps, the per stream SINRs corresponding to the possible modulation combinations are generated respectively.

In step 703, the receiving end scales the channel matrix. In more detail, the receiving end confirms a scaling value which makes a distance between the points in the constellation of the modulation schemes per stream '1' and shifts the channel matrix according to the scaling value based on Equation 1. As a result, the scaled channel matrixes corresponding to the possible modulation combinations are generated respectively.

In step 705, the receiving end generates the lattice reduction matrixes T corresponding to the scaled channel matrixes using the lattice reduction. The lattice reduction matrix is a matrix where the real part and the imaginary part of every element of the lattice reduction matrix and its inverse matrix are integers. Different lattice reduction matrixes are produced according to the channel matrix. The generation of the lattice reduction matrix is well known in the art through various searches. The present invention is applicable to any other various methods, which shall be omitted for brevity.

In step 707, the receiving end derives the per stream error components of the modulation combinations using the lattice reduction matrixes, and calculates the per stream SERs using the per stream error components. That is, the receiving end calculates the effective noise using the lattice reduction matrix and calculates the upper boundary of the per stream SER using the effective noise. The effective noise is given by Equation 5, and the upper boundary of the per stream SER is given by Equation 34.

After attaining the upper boundary of the per stream SER, the receiving end converts the SERs calculated in step 707 to SINRs in step 709. The conversion to the SINR differs depending on the modulation scheme. For example, when the modulation scheme is 4-QAM or 16-QAM, the conversion to the SINR is conducted based on one of Equation 33. Since the expression for converting the SER to the SINR is well known in the art, expressions for other modulation schemes shall be omitted here.

In step 711, the receiving end excludes the SINR set not satisfying the required minimum SINR of the modulation scheme from the candidates.

In step 713, the receiving end calculates the sum rate of each modulation combination.

In step 715, the receiving end determines the SINR set of the modulation combination having the highest sum rate amongst the modulation combinations meeting the required minimum SINR as the final channel quality information.

The per stream channel quality information generated as above is fed back to the transmitting end and used by the transmitting end to determine the scheduling scheme and the transmit signal modulation scheme. Yet, since the modulation scheme is determined together in the generation of the per stream channel quality information, the modulation information may be fed back directly. Accordingly, the receiving end sends the per stream channel quality information or the modulation information to the transmitting end.

In the light of the foregoing, the MIMO wireless communication system generates the per stream CQI using the effective noise calculated through the lattice reduction scheme. Therefore, the feedback information for the CL MIMO system can be produced.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for a receiving end in a Multiple-Input Multiple-Output (MIMO) wireless communication system, comprising:
   a receiver configured to receive signals from a transmitting end via a plurality of antennas;
   an estimator configured to estimate channels per antenna in relation with the transmitting end using the received signals and constituting a channel matrix; and
   a generator configured to derive per stream effective noises based upon a result of a lattice reduction scheme being applied to the channel matrix and generate per stream channel quality information (CQI) using the per stream effective noise,
   wherein the lattice reduction scheme scales the channel matrix and received signals by transforming a distance between neighboring points in a constellation into a certain integer.

2. The apparatus of claim 1, wherein the generator further comprises:
   a transformer configured to generate one or more scaled channel matrixes corresponding to possible modulation combinations by scaling the channel matrix to make the certain integer of the distance between the neighboring points in the constellation of modulation schemes per stream;
   an operator configured to produce one or more lattice reduction matrixes corresponding to one or more scaled channel matrixes respectively;
   at least one calculator configured to calculate effective noises when a lattice reduction scheme is applied to the one or more modulation combinations, and calculate the per stream symbol error rates of the modulation combinations using the effective noise;
   a converter for configured to convert the symbol error rates to signal to interference and noise ratios (SINRs); and a determiner configured to determine a per stream SINR set having a highest sum rate, among per stream SINR sets of the modulation combinations, as final per stream channel quality information.

3. The apparatus of claim 2, wherein the at least one calculator is further configured to calculate an upper boundary of the per stream symbol error rates using the effective noise.

4. The apparatus of claim 3, wherein the determiner is further configured to exclude at least one modulation combination which does not meet a required minimum signal to interference and noise ratio (SINR) of the modulation scheme, and determine a per stream SINR set of the modulation combination having a highest sum rate among at least one modulation combination meeting the required minimum signal to interference and noise ratio (SINR) as the final per stream channel quality information.

5. The apparatus of claim 4, wherein the at least one calculator comprises:
a first calculator configured to calculate an upper boundary of the per stream symbol error rates of the modulation combination having a lattice reduction matrix of a unit matrix; and
a second calculator configured to calculate an upper boundary of the per stream symbol error rates of the modulation combination having a lattice reduction matrix of a non unit matrix.

6. The apparatus of claim 5, wherein the first calculator and the second calculator are further configured to calculate the upper boundary of the per stream symbol error rates by calculating detection error probabilities corresponding to exterior constellation points, calculating, when there are interior constellation points, detection error probabilities corresponding to the interior constellation points, and averaging the detection error probabilities on the stream basis.

7. The apparatus of claim 6, wherein the first calculator is further configured to calculate a probability that a sum of a transmit signal and the effective noise is an integer point in a feasible region with respect to a target stream of the symbol error rate to be calculated, and derive detection error probabilities corresponding to the exterior constellation points from the probability, and
when there are interior constellation points, the first calculator is further configured to calculate a probability that a rounded value of the effective noise is zero with respect to the target stream, and derive the detection error probabilities corresponding to the interior constellation points from the probability.

8. The apparatus of claim 6, wherein the second calculator is further configured to calculate a probability that a sum of a product of the rounded value of the effective noise and a row corresponding to the target stream of the symbol error rate to be calculated in the lattice reduction matrix, and the transmit signal is one of integer points in the feasible region, and derive the detection error probabilities corresponding to the exterior constellation points from the probability, and
when there are interior constellation points, the second calculator is further configured to calculate a probability that rounded value of the effective noise in every stream is zero, and derive the detection error probabilities corresponding to the interior constellation points from the probability.

9. The apparatus of claim 5, wherein the first calculator and the second calculator are further configured to calculate a secondary effective noise by dividing the effective noise by a diagonal element of an R matrix acquired by QR-decomposing an effective channel matrix, and calculate an upper boundary of the per stream symbol error rate using the secondary effective noise.

10. The apparatus of claim 9, wherein the first calculator is further configured to calculate a probability that the secondary effective noise is zero with respect to the target stream of the symbol error rate to be calculated and all of streams interfered by the target stream, and derive the upper boundary of the per stream symbol error rate from the probability.

11. The apparatus of claim 9, wherein the second calculator is further configured to calculate a probability that the second effective noise is zero for all of streams, and derive the upper boundary of the per stream symbol error rate from the probability.

12. The apparatus of claim 1, further comprising:
a transmitting configured to feed per stream channel quality information or modulation combination information corresponding to the per stream channel quality information back to the transmitting end.

13. A method for generating per stream Channel Quality Information (CQI) in a Multiple-Input Multiple-Output (MIMO) wireless communication system, the method comprising:
receiving signals from a transmitting end via a plurality of antennas;
constituting a channel matrix by estimating channels per antenna in relation with the transmitting end using the received signals;
deriving per stream effective noise based upon a result of a lattice reduction scheme being applied to the channel matrix, wherein the lattice reduction scheme scales the channel matrix and received signals by transforming a distance between neighboring points in a constellation into a certain integer; and
generating per stream channel quality information using the per stream effective noise.

14. The method of claim 13, wherein deriving the per stream effective noise and generating the per stream channel quality information comprises:
generating one or more scaled channel matrixes corresponding to possible modulation combinations by scaling the channel matrix to make the certain integer of the distance between the neighboring points in the constellation of modulation schemes per stream;
producing one or more lattice reduction matrixes corresponding to one or more scaled channel matrixes respectively;
calculating an effective noise when a lattice reduction scheme is applied to streams of the modulation combinations;
calculating per stream symbol error rates (SERs) using the effective noise;
converting the symbol error rates to signal to interference and noise ratios (SINRs); and
determining a per stream SINR set having a highest sum rate, among per stream SINR sets of the modulation combinations, as final per stream channel quality information.

15. The method of claim 14, wherein the calculating of the per stream symbol error rates calculates an upper boundary of the per stream symbol error rates using the effective noise.

16. The method of claim 15, wherein the determining of the per stream SINR set having the maximum sum rate as the final per stream channel quality information comprises:
excluding at least one modulation combination which does not meet a required minimum SINR of the modulation scheme; and determining a per stream SINR set of the modulation combination having a highest sum rate among at least one modulation combination not excluded as the final per stream channel quality information.

17. The method of claim 16, wherein the calculating of the per stream symbol error rates comprises:
when the lattice reduction matrix is a unit matrix, calculating an upper boundary of the per stream symbol error rate in a first manner; and
when the lattice reduction matrix is not a unit matrix, calculating an upper boundary of the per stream symbol error rate in a second manner.

18. The method of claim 17, wherein the calculating of the per stream symbol error rates comprises:
calculating detection error probabilities corresponding to exterior constellation points;
when there are interior constellation points, calculating detection error probabilities corresponding to the interior constellation points; and
calculating the upper boundary of the per stream symbol error rate by averaging the per stream detection error probabilities.

19. The method of claim 18, wherein the calculating of the upper boundary of the per stream symbol error rate in the first manner comprises:
calculating a probability that a sum of a transmit signal and the effective noise is an integer point in a feasible region with respect to a target stream of the symbol error rate to be calculated, and deriving the detection error probabilities corresponding to the exterior constellation points from the probability; and
when there are interior constellation points, calculating a probability that a rounded value of the effective noise of the target stream is zero, and deriving the detection error probabilities corresponding to the interior constellation points from the probability.

20. The method of claim 18, wherein the calculating of the upper boundary of the per stream symbol error rate in the second manner comprises:
calculating a probability that a sum of a product of the rounded value of the effective noise and a row corresponding to the target stream of the symbol error rate to be calculated in the lattice reduction matrix, and the transmit signal is one of integer points in the feasible region, and deriving the detection error probabilities corresponding to the exterior constellation points from the probability; and
when there are interior constellation points, calculating a probability that rounded value of the effective noise in every stream is zero, and deriving the detection error probabilities corresponding to the interior constellation points from the probability.

21. The method of claim 17, wherein the calculating of the per stream symbol error rates comprises:
calculating a secondary effective noise by dividing the effective noise by a diagonal element of an R matrix acquired by QR-decomposing an effective channel matrix; and
calculating an upper boundary of the per stream symbol error rate using the secondary effective noise.

22. The method of claim 21, wherein the upper boundary of the per stream symbol error rate in the first manner comprises:
calculating a probability that the secondary effective noise is zero with respect to a target stream of the symbol error rate to be calculated and all of streams interfered by the target stream; and
deriving the upper boundary of the per stream symbol error rate from the probability.

23. The method of claim 21, wherein the calculating of the upper boundary of the per stream symbol error rate in the second manner comprises:
calculating a probability that the second effective noise is zero for all of streams; and
deriving the upper boundary of the per stream symbol error rate from the probability.

24. The method of claim 13, further comprising:
feeding per stream channel quality information or modulation combination information corresponding to the per stream channel quality information back to the transmitting end.

* * * * *